(No Model.)

J. T. GURNEY.
PASSENGER VEHICLE.

No. 260,293. Patented June 27, 1882.

Witnesses:
H. N. Law
L. H. Marshall

Inventor:
J. Theodore Gurney
by Doubleday & Bliss
attys

UNITED STATES PATENT OFFICE.

J. THEODORE GURNEY, OF BOSTON, MASSACHUSETTS.

PASSENGER-VEHICLE.

SPECIFICATION forming part of Letters Patent No. 260,293, dated June 27, 1882.

Application filed March 18, 1882. (No model.)

*To all whom it may concern:*

Be it known that I, J. THEODORE GURNEY, a citizen of the United States, residing at Boston, in the county of Suffolk and State of Massachusetts, have invented certain new and useful Improvements in Passenger-Vehicles, of which the following is a specification, reference being had therein to the accompanying drawings.

Figure 1:
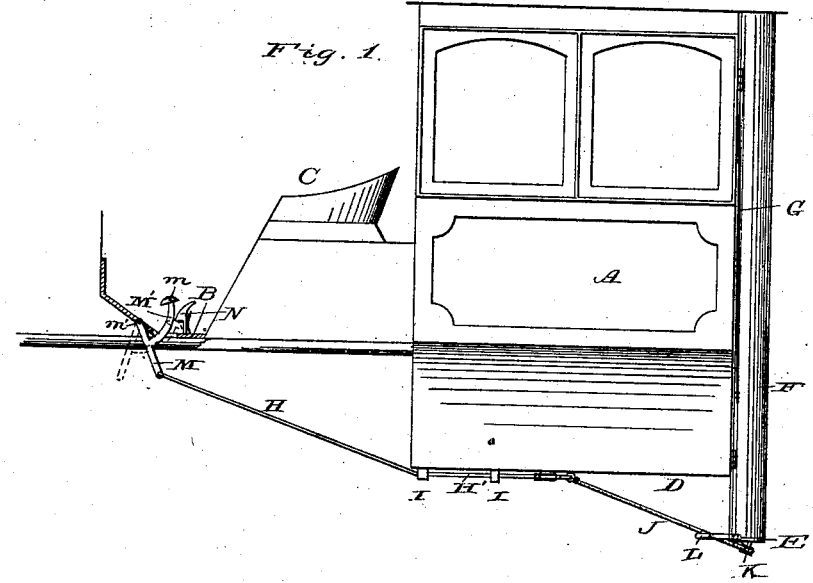
Figure 2:
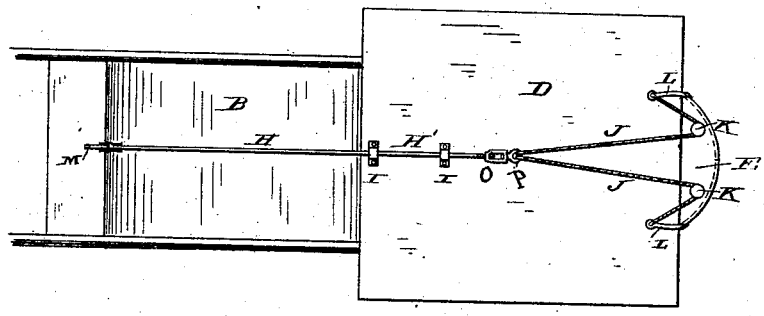
Figure 4:
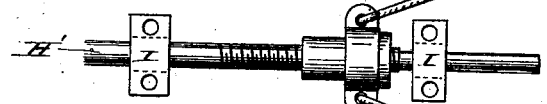
Figure 3:
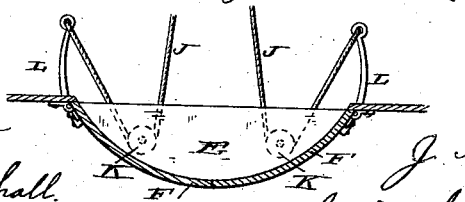

Figure 1 is a side elevation of a vehicle embodying my improvement. Fig. 2 is a bottom plan view. Fig. 3 is a view of the rear portion of the vehicle detached. Fig. 4 shows a modified form of device for connecting the cords to the sliding rod.

I will first describe the parts which (or their equivalents) are necessary for carrying out my invention, and will then set forth those which may be varied to permit my improvements to be applied to vehicles of various kinds.

In the drawings I have shown my improvements in connection with a vehicle of the class now known as the "two-wheeled Herdic," A representing the body; B, the driver's platform; C, the driver's seat; D, the bottom of the body or bed; E, the step, and F the doors at the rear end.

Preferably the step E is arranged as shown, it being somewhat lower than the bottom D of the body, and the doors are arranged in a manner heretofore followed, so that they shall have handles upon the inside, but be unprovided with handles or knobs upon the outside. The doors, however, are provided with returning-springs, which operate in a manner exactly opposite to that in which operate the springs heretofore used with doors for vehicles of this class—that is to say, the springs G G are combined with the hinges in such manner as to always tend to hold the door closed, and when the springs are not interfered with by the driver or other person they will hold the doors thus closed; whereas, on the contrary, in vehicles of this class heretofore the door-springs have been so arranged as to automatically throw the door open when released by the driver.

In my construction the driver opens the door by means of the following devices:

H H' represent a rod, preferably made of iron, and situated below the driver's platform and the vehicle. When it is applied to vehicles of the character shown that part of the rod in front of the body of the vehicle is inclined somewhat, the portion H' beneath the vehicle proper being preferably, however, situated substantially parallel to the bottom of the vehicle, as shown. This rod is arranged to slide, to a limited extent, forward and back, it being provided with a guide or guides, I, of any suitable number and character. At the rear end it is attached to a rope or ropes, or chains or cords, or other suitable flexible draft device, as shown at J J. These cords J J extend rearwardly and downwardly sufficient to bring them below the step E, where they are arranged around one or more guide-pulleys, K K, extending thence to the ends of arms or levers L, secured to the doors F. The arms L are fastened to the doors at the lower ends thereof, and are bent downwardly and backwardly to a sufficient distance, being at their rear ends connected with the cords J J. When a forward pull is exerted upon the cords through the rod H H' the doors F F will be swung open. The rod H H' is drawn forward by the operator with his foot. I use a mechanism preferably consisting of a lever, M M', shaped after the manner of a bell-crank lever, and provided with a foot-piece or pedal, *m*. It is pivoted at *m'* to the driver's platform, the part M extending downwardly and being connected pivotally with the rod H H'. The driver, by pressing his foot downwardly upon the pedal *m*, throws forward the part M, which draws forward the rod H H' and the cords J J. The latter, by means of the devices above described, draw open the doors F F.

If it is desired to hold the doors open, the upwardly-projecting part M' of the lever M M' is fastened in a notched catch at N on the platform. This catch may be of any suitable character, preferably having a spring which can be released by the operator's foot. Preferably the flexible portion of the draft devices for operating the door is connected with the rod H H' by adjusting devices for regulating the tension of the flexible part. As shown, these adjusting devices consist of a part, O, engaging with the rod H H' by a screw-thread, and a swiveling-eye, P, secured thereto. The cords J J are attached to the eye P.

It will be seen that with the devices I have described the operator can control the door without using either of his hands.

The springs which are combined with the doors operate to hold them shut with sufficient force to prevent them from being opened from the outside without the assistance of the driver, whereas they can be readily opened from the inside. In the vehicles of this class heretofore used the doors cannot be opened from the inside until the cord running to the driver's platform has been released. By arranging the devices which operate the door below the vehicle they are concealed from sight, and I can thus make the interior of the vehicle more neat and tasty than when one or more cords and their supporting devices are arranged inside of it.

In Fig. 4 I have shown another method of supporting and guiding the reciprocating rod below the carriage-bed. In this case one of the loops or guides I is placed on each side of the turn-buckle or connecting device for the cords J J. The rod passes entirely through the nut or threaded sleeve, and upon the outside of the sleeve is placed a loose collar for carrying the cords.

Devices of the above-described character can be combined with four-wheeled vehicles, as will be readily seen.

What I claim is—

1. The combination, with the automatically-closing swinging doors, of means controllable by the driver for opening the door, and a pedal or device with which the driver can engage his foot, substantially as set forth.

2. The combination, with the automatically-closing swinging door, of the levers at the lower ends and the devices for opening the door, connected with said levers and controllable by the foot of the driver, substantially as set forth.

3. The combination, with the automatically-closing doors, of the means for opening the same, situated beneath the vehicle, substantially as set forth.

4. The combination, with the doors and the devices for opening the same, extending to the driver's platform, of the adjusting devices attached together by a screw-thread, for regulating the tension of the door-opening devices, substantially as set forth.

5. The combination, with the door and the devices for opening the same, extending to the driver's platform, and having between the door and the platform a threaded rod, of the threaded nut to engage with said rod, and connected with the devices which pull the doors, whereby the tension of the door-opening devices may be regulated, substantially as set forth.

6. The combination, with the doors and devices for opening the same, extending to the driver's platform, and having the part H' between the door and the platform, of the part O, attached to the door-pulling devices, and arranged, substantially as set forth, to be secured to the part H' at different points.

In testimony whereof I affix my signature in presence of two witnesses.

J. THEODORE GURNEY.

Witnesses:
JAS. T. MCLAUGHLIN,
HENRY H. PAGE.